US007082122B2

(12) United States Patent
Pan

(10) Patent No.: US 7,082,122 B2
(45) Date of Patent: Jul. 25, 2006

(54) METHOD AND SYSTEM FOR CONNECTING TO A PROXY SERVER WITH THE LOWEST WORKLOAD THROUGH A LOAD BALANCING PROXY SERVER

(75) Inventor: Huang-Ming Pan, San Jose, CA (US)

(73) Assignee: Innomedia PTE Ltd., The Alpha (SG)

( * ) Notice: Subject to any disclaimer, the term of this patent is extended or adjusted under 35 U.S.C. 154(b) by 948 days.

(21) Appl. No.: 10/036,024

(22) Filed: Dec. 24, 2001

(65) Prior Publication Data
US 2003/0118004 A1 Jun. 26, 2003

(51) Int. Cl.
*H04L 12/66* (2006.01)
*G06F 9/46* (2006.01)

(52) U.S. Cl. .................................. 370/352; 718/105
(58) Field of Classification Search ........ 370/229–235, 370/252, 352; 718/105
See application file for complete search history.

(56) References Cited

U.S. PATENT DOCUMENTS

| 5,345,587 A * | 9/1994 | Fehskens et al. ............ 718/102 |
| 6,128,279 A * | 10/2000 | O'Neil et al. ................ 370/229 |
| 6,141,341 A | 10/2000 | Jones et al. .................. 370/352 |
| 6,259,691 B1 | 7/2001 | Naudus ........................ 370/352 |
| 6,442,165 B1 * | 8/2002 | Sitaraman et al. ........ 370/395.4 |
| 6,601,084 B1 * | 7/2003 | Bhaskaran et al. .......... 718/105 |
| 6,671,259 B1 * | 12/2003 | He et al. ...................... 370/238 |
| 6,680,947 B1 * | 1/2004 | Denecheau et al. ......... 370/396 |
| 6,725,253 B1 * | 4/2004 | Okano et al. ................ 709/203 |
| 6,795,867 B1 * | 9/2004 | Ma et al. ..................... 709/240 |
| 6,947,385 B1 * | 9/2005 | Havens ........................ 370/236 |
| 2003/0056002 A1 * | 3/2003 | Trethewey ................... 709/238 |

FOREIGN PATENT DOCUMENTS

| WO | WO 01/05115 A2 | 1/2001 |
| WO | WO 01/76276 A2 | 10/2001 |

* cited by examiner

*Primary Examiner*—Chau Nguyen
*Assistant Examiner*—Kerri M. Dyke
(74) *Attorney, Agent, or Firm*—Renner, Otto, Boisselle & Sklar, LLP

(57) ABSTRACT

A system and method for providing a Voice-over Internet Protocol (VoIP) system configured to allow voice data to be transmitted and received over a network. The VoIP system includes a network including at least two VoIP proxy servers configured to allow voice data to be transmitted and received over the network. The VoIP system also includes at least two VoIP clients operatively coupled to the network to transmit and receive voice data over the network and a load balancing proxy server device configured to determine an identity of a VoIP proxy server with a lowest workload. The load balancing proxy server device is also configured to provide the identity of the VoIP proxy server with the lowest workload to one of the at least two VoIP clients so that the one of the at least two VoIP clients can connect to the VoIP proxy server with the lowest workload in order to transmit and receive voice data in relation to another of the at least two VoIP clients.

14 Claims, 5 Drawing Sheets

METHOD AND SYSTEM FOR CONNECTING TO A PROXY SERVER WITH THE LOWEST WORKLOAD THROUGH A LOAD BALANCING PROXY SERVER

TECHNICAL FIELD

The present invention generally relates to Internet Protocol (IP) telephony and, more specifically, relates to a method and system for connecting to a proxy server with the lowest workload through querying a load balancing proxy server.

BACKGROUND ART

IP telephony is a collection of technologies that emulates and extends today's circuit-switched telecommunications services to operate on packet-switched data networks based on the Internet Protocol (IP). IP telephony encompasses the terms "Internet Telephony", "voice-over-IP" (VoIP), "video-over-IP", and "fax-over-IP", and extends those capabilities even further to include new telecommunications applications made possible by the convergence of voice, video and data. "Voice-over-IP" (VoIP) technology enables the real-time transmission of voice signals as packetized data over "IP networks" that employ the Transmission Control Protocol (TCP), Real-Time Transport Protocol (RTP), User Datagram Protocol (UDP), and Internet Protocol (IP) suite, for example.

A conventional Public Switched Telephone Network (PSTN) provides its users with dedicated, end-to-end circuit connections for the duration of each call. Based on the calling and called parties' numbers, circuits are reserved among an originating switch, any tandem switches along the route between the two ends of the call, and a terminating switch. Signaling between these PSTN switches supports basic call setup, call management, and call teardown as well as querying of databases to support advanced services such as local number portability, mobile subscriber authentication and roaming, virtual private networking, and toll-free service.

The conventional PSTN has served voice traffic well over the last 100 years, but its success has been paralleled by a rise of separate networks to support data traffic. These separate networks include, for example, the World-Wide Web which is commonly referred to as the Internet, an Intranet, a wide-area network (WAN), a local area network (LAN), an ATM, a T1 network, an E1 network, an Ethernet, a microwave network, a satellite network or the like, or a combination thereof. Clearly, use of distinct networks for voice and data represents an additional burden to service providers and an additional cost to consumers. As more and more PSTN traffic becomes data-oriented, however, the trend toward voice and data network convergence becomes stronger and stronger. Service providers, Internet service providers, and manufacturers of switching, transmission, and customer premises equipment are all participating in a significant shift of the telecommunications industry toward combined voice/video/data networking using IP.

The shift to IP telephony promises better efficiencies in the transport of voice and data, and, as a result, lower telecommunications costs to end users. Moreover, as IP telephony evolves, it will be able to match all the features of voice communications currently supported by the PSTN. Interoperability among the IP telephony products of different vendors is the first major hurdle to overcome. The real promise of IP telephony, however, will be realized with the next wave of advanced services that will begin to surpass the capabilities of the PSTN.

There are, however, some drawbacks associated with existing IP telephony systems. For example, in VoIP systems, most VoIP clients need to connect to a VoIP proxy server in order to complete a call. After the VoIP client connects to a VoIP proxy server, the overall system can provide services for the VoIP client. In conventional systems, many VoIP clients attempt to connect to a designated VoIP proxy server at the same time. This increases the workload on the designated VoIP proxy server, even though other VoIP proxy servers in the VoIP system may have much lower workloads. This results in the workload on the VoIP system becoming unbalanced. This occurs even if the VoIP client connects to VoIP proxy servers connected in a conventional round robin manner. Round robin connection does not guarantee that the workload will be equally distributed among the VoIP proxy servers. In many instances, the VoIP client lacks information on the workload of each VoIP proxy server and is unable to connect to the optimal VoIP proxy server, i.e., a VoIP proxy server with the lowest workload.

Therefore, there exists a strong need in the art for a system and method which identifies and utilizes the VoIP proxy server with the lowest workload. Such a system and method would provide the identity of the VoIP proxy server with the lowest workload to the VoIP client in order to more efficiently complete the call.

SUMMARY OF THE INVENTION

According to one aspect of the invention, the invention is a Voice-over Internet Protocol (VoIP) system. The VoIP system includes a network including at least two VoIP proxy servers configured to allow voice data to be transmitted and received over the network. The VoIP system also includes at least two VoIP clients operatively coupled to the network to transmit and receive voice data over the network and a load balancing proxy server device configured to determine an identity of a VoIP proxy server with a lowest workload. The load balancing proxy server device is also configured to provide the identity of the VoIP proxy server with the lowest workload to one of the at least two VoIP clients so that the one of the at least two VoIP clients can connect to the VoIP proxy server with the lowest workload in order to transmit and receive voice data in relation to another of the at least two VoIP clients.

According to another aspect of the invention, the invention is a method for connecting at least two Voice-over Internet Protocol (VoIP) clients to a VoIP system, wherein the VoIP system comprises a network of at least two VoIP proxy servers, a load balancing proxy server and a VoIP proxy server which has a lowest workload. The method includes the step of determining an identity of the VoIP proxy server which has the lowest workload of the at least two VoIP proxy servers. The method further includes the step of connecting of one of the at least two VoIP clients to the VoIP proxy server with the lowest workload in order to transmit and receive voice data in relation to another of the at least two VoIP clients.

BRIEF DESCRIPTION OF DRAWINGS

These and further features of the present invention will be apparent with reference to the following description and drawings, wherein.

DISCLOSURE OF INVENTION

To illustrate the present invention in a clear and concise manner, the drawings may not necessarily be to scale and certain features may be shown in a partial schematic format.

The present invention is a VoIP system including a load balancing proxy server with which a VoIP client communicates with before it connects to an optimal VoIP proxy server, i.e., a VoIP proxy server with the lowest workload. Further, the invention includes a method for determining and identifying the optimal VoIP proxy server based on a response received from a VoIP proxy server as a result of requests to several VoIP proxy servers from the load balancing proxy server. Further, the method includes providing the identity of the VoIP proxy server to the VoIP client so that the VoIP client may connect.

In one embodiment, when the load balancing proxy server receives a request from a VoIP client wanting to connect to the VoIP system, the load balancing proxy server generates requests to all VoIP proxy servers and awaits a response. When the load balancing proxy server first receives a response from a VoIP proxy server, the load balancing proxy server immediately cancels the other requests. The first responding VoIP proxy server is assumed to be the VoIP proxy server with the lowest workload. In response to the client request, the load balancing proxy server provides the identity of the VoIP proxy server to the VoIP client. The VoIP client then connects to the identified VoIP proxy server and accesses the VoIP system. Thus, the load balancing proxy server balances the workload of VoIP proxy servers.

Figure 1:
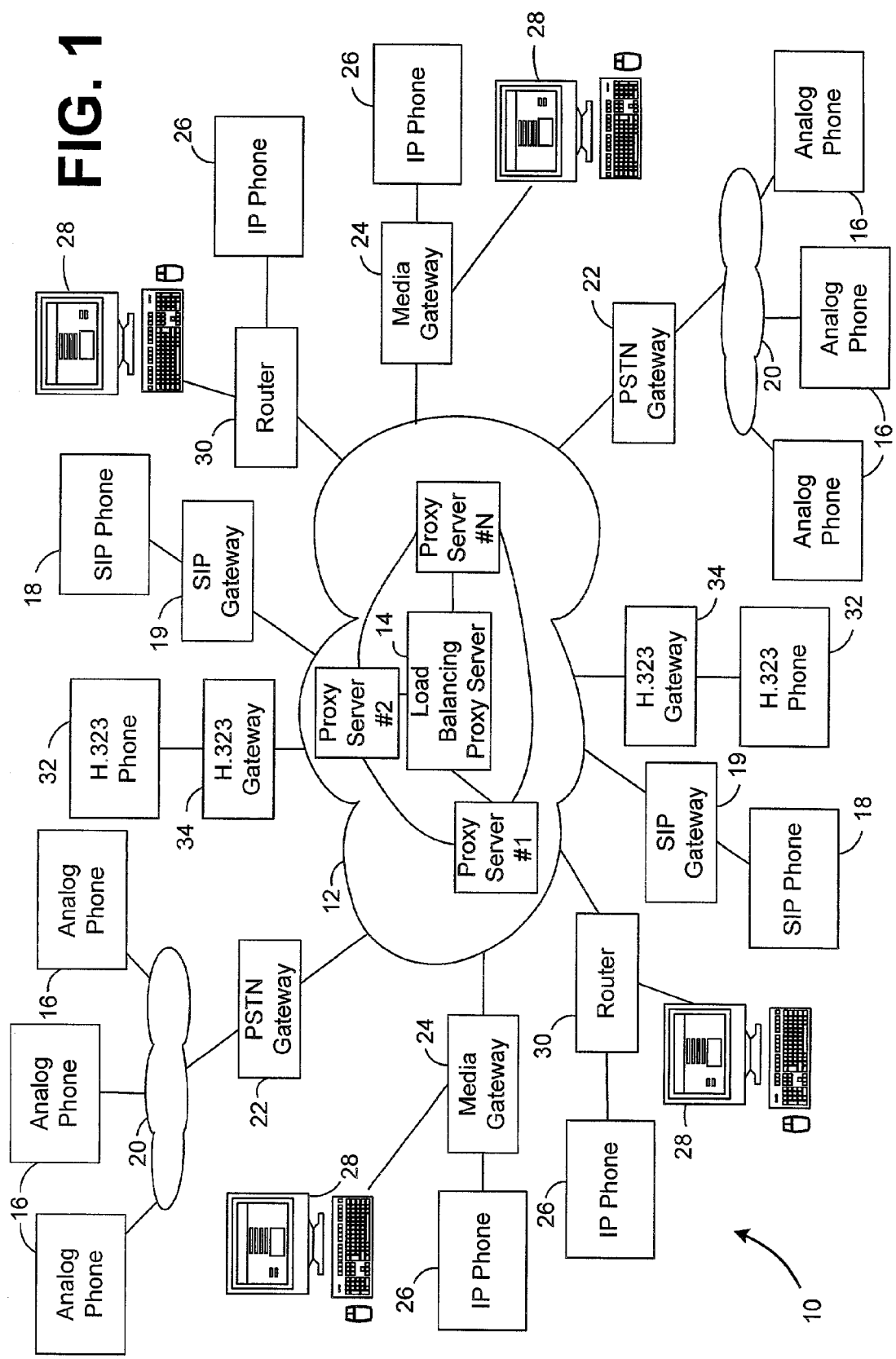
FIG. 1 is a system level diagram of a VoIP system including a load balancing proxy server according to an embodiment of the present invention.

Referring initially to FIG. 1, an embodiment of a VoIP system, generally designated as 10, is shown. The VoIP system 10 includes a digital data network over which digitized voice signals are transmitted as a stream of packets. The underlying digital data network may be an IP network 12, for example, a proprietary network, a network of leased facilities, the Internet, an Intranet, a WAN, a LAN, a virtual private network (VPN), an ATM, a T1 network, an E1 network, an Ethernet, a microwave network, a satellite network or the like, or a combination thereof. Within the IP network 12 are a plurality of VoIP proxy servers, servers #1 through #N, for example. The plurality of proxy servers are coupled together, for example, via conventional network routing or other means known by those with ordinary skill in the art. A load balancing proxy server 14 is coupled to servers #1 through #N, for example, via conventional network routing or other means known by those with ordinary skill in the art. The operation of the load balancing proxy server 14 in relation with servers #1 through #N, a transmitting or calling VoIP client, and a receiving VoIP client will be further explained below with reference to FIGS. 2–5. It should be understood that included in the IP network 12 will be other network devices to complete the network such as gateways, routers, switches, etc. (not shown).

A plurality of conventional analog phones 16 may be coupled to the IP network 12 via a local PSTN gateway 22. The plurality of analog phones 16 may be part of a local PSTN 20. Thus, the plurality of analog phones 16 may access the VoIP system 10 locally using known techniques.

Additionally, various "Session Initiation Protocol" (SIP) phones 18 may be coupled to the IP network 12 via a SIP gateway 19, for example. A plurality of IP phones 26 and/or computers 28, for example, may also be coupled to the IP network 12 via various media gateways 24 and/or various routers 30. Additionally, various H.323 phones 32 may be coupled to the IP network 12 via an H.323 gateway 34, for example.

Each computer 28 may have, for example, a pair of speakers and a microphone (not shown), or may have a headset with a microphone (not shown). Alternatively, a computer video camera with a microphone may be coupled to the computer 28 (not shown). The computer 28 may be a personal computer (PC) configured as a multimedia computer, a mobile computing device such as a laptop computer or the like. The computer 28 may execute logic, e.g., software, in order to place a VoIP call.

As will be appreciated, the analog phones 16, the SIP phones 18, the IP phones 26, the computers 28, the H.323 phones 32, etc., via their respective gateways or routers, represent VoIP clients within the VoIP system 10. The VoIP clients are each capable of making and receiving telephone calls via the IP network 12 by transmitting and receiving digital voice data packets therebetween. The actual procedures and protocols for exchanging such data employs conventional VoIP techniques except as otherwise described herein. Thus, the description herein focuses primarily on the inventive aspects.

Next, the general operation of the VoIP system 10 will be described. As previously mentioned, the VoIP system 10 utilizes VoIP technology to allow voice calls to be originated and terminated on various types of platforms over the IP network 12. For example, the analog phones 16 supported by a conventional PSTN can place and receive calls over the IP network 12. Alternatively, a SIP phone 18 or an IP phone 26 can place a call to an analog phone 16 on a local PSTN 20. The local PSTN 20 may be in another city, state or country. Further still, a computer 28 can call another computer 28, a SIP phone 18, an IP phone 26, an analog phone 16, a cell phone (not shown), a satellite phone (not shown) or the like, or a combination thereof.

In yet another alternative, any of the aforementioned VoIP clients may place a call to a VoIP proxy server which hosts special services. For example, a VoIP proxy server may host voice mail or video mail. A VoIP client can connect to the VoIP proxy server to retrieve voice or video mail in an otherwise conventional manner.

The VoIP technology translates a destination telephone number into a data network address ("IP address") associated with a corresponding terminating gateway nearest to the destination number. Using an appropriate protocol and packet transmission over the IP network 12, the terminating gateway will transmit the call directly to the VoIP client or initiate a call to the destination phone number over the local PSTN 20 at the receiving destination to completely establish end-to-end two-way communications. Despite the additional connections required, the overall call setup time is not significantly longer than with a call fully supported by a conventional PSTN.

In general, in order to complete a call by accessing the VoIP proxy server on the IP network 12, a VoIP client first establishes a connection with the load balancing proxy server 14. Next, the VoIP client places a request to the load balancing proxy server 14 for the identity of a VoIP proxy server to connect with in order to complete the call. The load balancing proxy server 14 proceeds to identify the optimal VoIP proxy server. The load balancing proxy server 14 determines and identifies the optimal VoIP proxy server based on which VoIP proxy server has the lowest workload. Next, the load balancing proxy server 14 prepares a response identifying the optimal VoIP proxy server and transmits the response to the VoIP client which issued the request. Once the response is received by the VoIP client, the VoIP client then connects to the VoIP proxy server thus identified in order to establish the call in an otherwise conventional manner.

As a result, the VoIP client wishing to make a call via the IP network 12 first issues a request to the load balancing proxy server 14 to ascertain which VoIP proxy server #1 through #N is experiencing the lowest workload. The VoIP client then establishes the call through that particular VoIP proxy server. In this manner, the present invention helps to avoid one or more VoIP proxy servers shouldering the majority of the workload while other of the VoIP proxy servers are underutilized at any given moment in time. This way, more optimum network connections may be established for each call, thereby reducing latency time, etc.

In the VoIP system 10, voice signals are digitized and transmitted as a stream of packets over the IP network 12. The IP network 12 allows each packet to independently find the most efficient path to the intended destination, thereby best using the network resources at any given instant. The packets associated with a single source may thus take many different paths to the destination in traversing the IP network 12, arriving with different end-to-end delays, arriving out of sequence, or possibly not arriving at all. At the destination, however, the packets are re-assembled and converted back into the original voice signal. VoIP technology insures proper reconstruction of the voice signals, compensating for echoes made audible due to the end-to-end delay, for jitter, and for dropped packets, etc.

Figure 2:
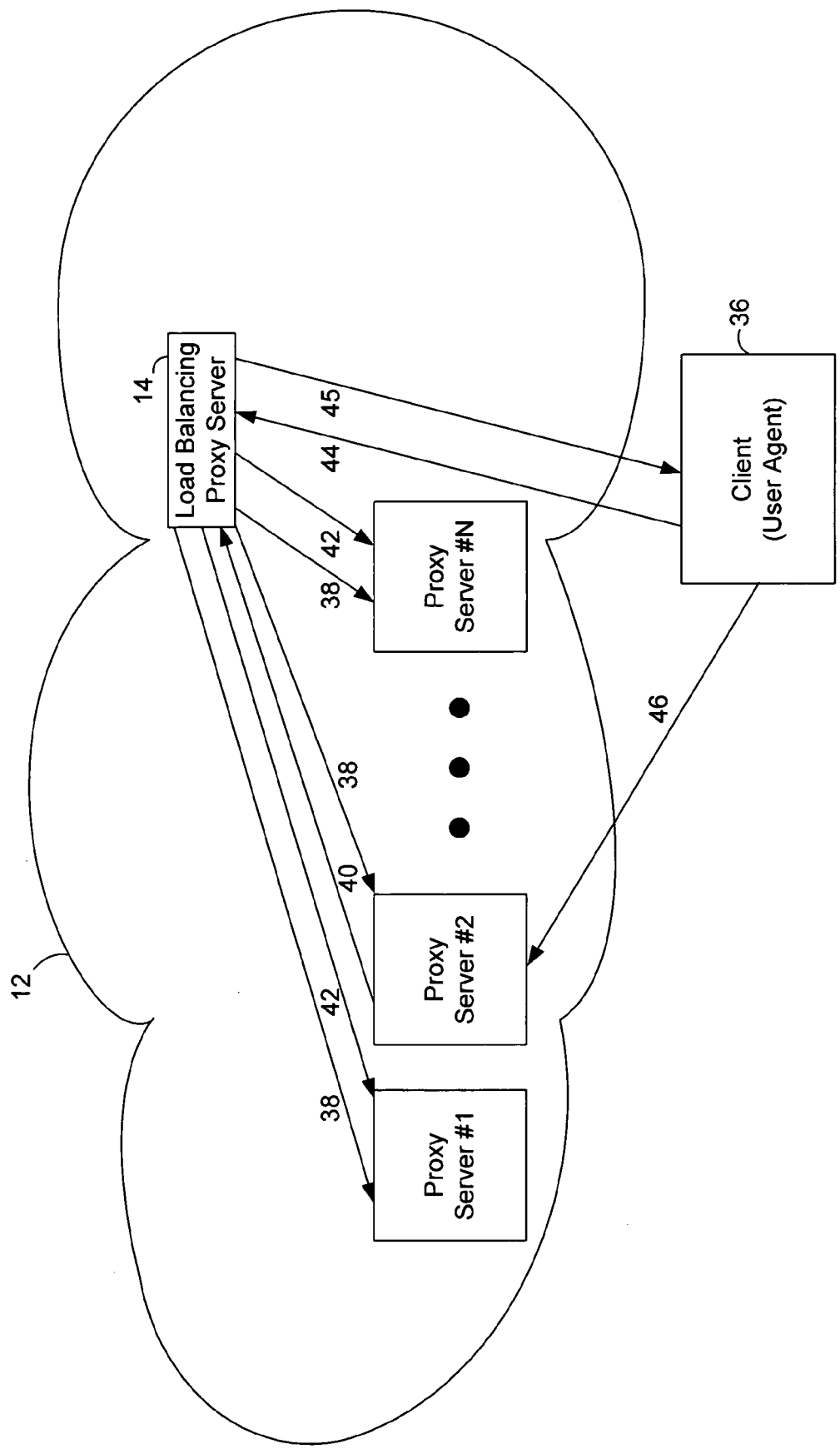
FIG. 2 is a detailed schematic flow diagram representing a VoIP client connecting to the VoIP system using the load balancing proxy server in an embodiment of the present invention.

Turning now to FIG. 2, the IP network 12 is shown enlarged with a representative VoIP client 36 (hereinafter client 36) attempting to connect to a VoIP proxy server in order to complete a VoIP call in accordance with the invention. The client 36 may be any device capable of transmitting and receiving voice data over a VoIP system. For example, the client 36 may take the form of one of the analog phones 16, the SIP phones 18, the IP phones 26, the computers 28, etc., which connect to the IP network 12 via its respective gateway or router. The steps of the call connection process will now be further explained with reference to FIGS. 3–5.

Figure 3:
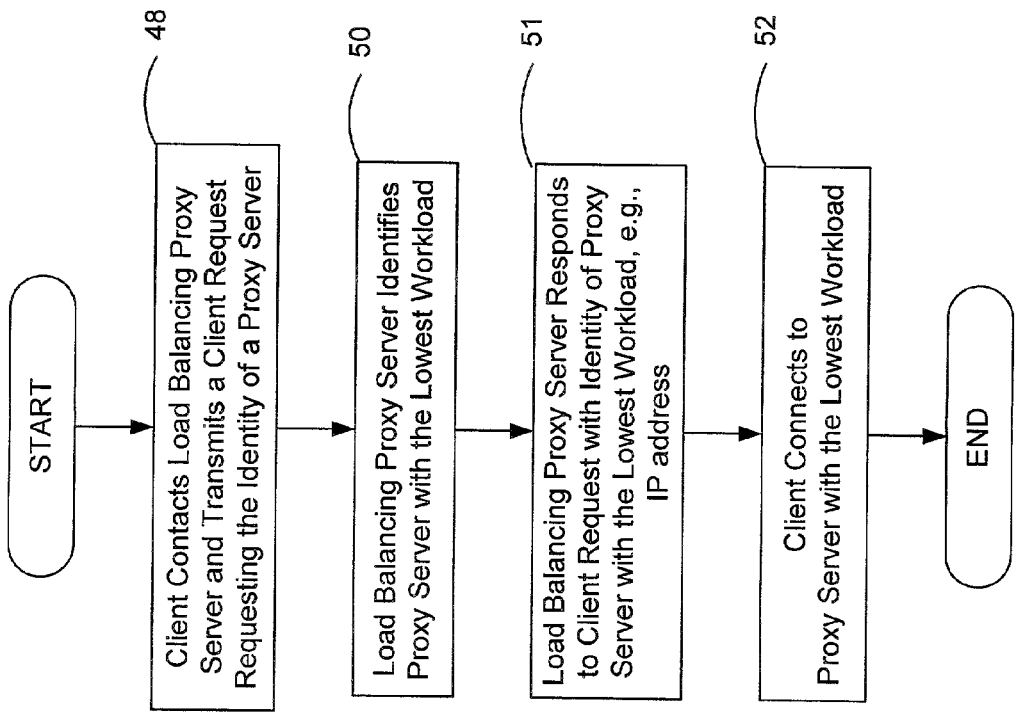
FIG. 3 is a flow diagram of a method for employing the load balancing proxy server according to the present invention.

Referring now to FIG. 3, the overall process is shown for identifying a VoIP proxy server on the VoIP system 10 in accordance with the present invention. In step 48, the load balancing proxy server 14 receives a request from client 36 requesting the identity of the VoIP proxy server having the lowest workload in order to place a VoIP call. The client request is represented by network connection line 44 in FIG. 2.

In step 50, the load balancing proxy server 14 identifies which VoIP proxy server has the lowest workload. Specifically, the load balancing proxy server 14 generates and transmits requests, represented by lines 38 in FIG. 2, to all VoIP proxy servers #1 through #N. Thereafter, the load balancing proxy server 14 awaits a response from any of the VoIP proxy servers. When the load balancing proxy server 14 first receives a response, represented by line 40 in FIG. 2, from a VoIP proxy server, the load balancing proxy server 14 immediately cancels the other requests, represented by lines 42 in FIG. 2. The first responding VoIP proxy server is then assumed to be the VoIP proxy server with the lowest workload and is thus identified by the load balancing proxy server 14. Such identification of the VoIP proxy server with the lowest workload is based on a heuristic that the VoIP proxy server #1 through #N which can first respond to a request should have a lighter workload at the time of receiving the request.

Next in step 51, the load balancing proxy server 14 responds to the request from the client 36 by providing the identity of the VoIP proxy server currently having the lowest workload. The response from the load balancing proxy server 14 that provides the identity of the VoIP proxy server to the client 36 is represented by network connection line 45 in FIG. 2. The identity of the server may be, for example, an IP address or the like which the load balancing proxy server 14 provides to the client 36.

Next in step 52, the client 36 connects to the VoIP proxy server identified as having the lowest workload using known network protocols, etc. For example, in FIG. 2, VoIP proxy server #2 represents the VoIP proxy server identified as having the lowest workload. Client 36 connects to the VoIP proxy server #2 via the network connection line 46, in order to complete the VoIP call in otherwise conventional fashion.

Figure 4:
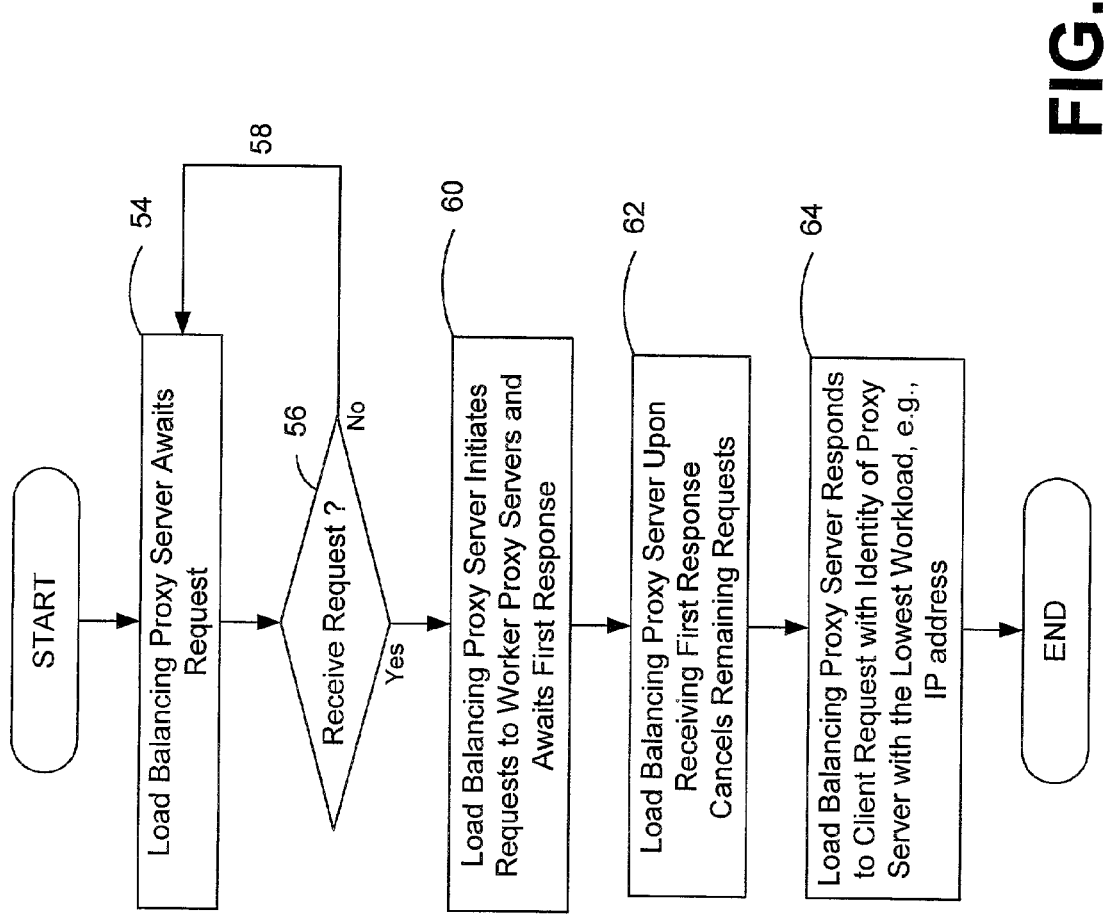
FIG. 4 is a flow diagram of a method for identifying the VoIP proxy server with the lowest workload according to an embodiment of the present invention.

Now referring to FIG. 4, the specific steps carried out by the load balancing proxy server 14 for identifying the server with the lowest workload will be described. In step 54, the load balancing proxy server 14 is in a standby mode awaiting a request from a VoIP client 36 requesting access to a VoIP proxy server.

Next in step 56, the load balancing proxy server 14 determines whether it has received a request from a client 36. If the answer is "no", then the load balancing proxy server 14 proceeds to continue to await a request from a VoIP client 36 to access one of the VoIP proxy servers as represented by line 58 in FIG. 4. However, if the answer is "yes", then the load balancing proxy server 14 proceeds to step 60.

In step 60, the load balancing proxy server 14 generates call requests to all VoIP proxy servers and awaits a response. Then in step 62, when the load balancing proxy server 14 receives the first response from a VoIP proxy server, the load balancing proxy server immediately cancels the other requests. The first responding VoIP proxy server is assumed to be the VoIP proxy server with lowest workload.

Next in step 64, the load balancing proxy server 14 prepares and transmits a packet containing the identity of the VoIP proxy server with the lowest workload to the requesting client 36.

Figure 5:
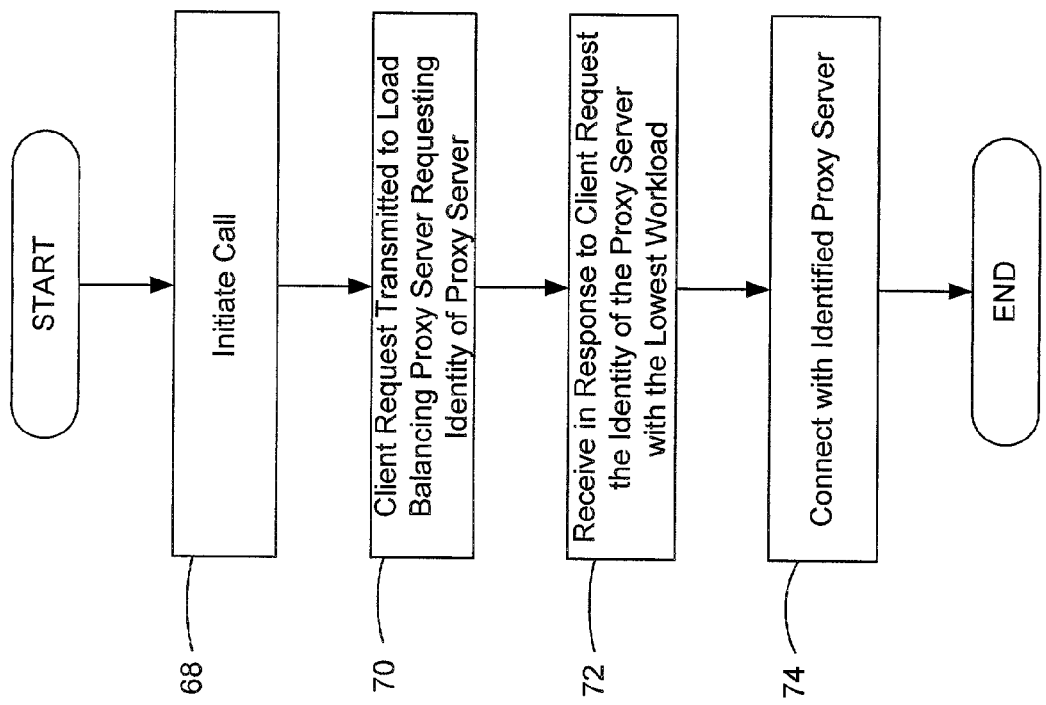
FIG. 5 is a flow diagram of a method for querying the load balancing proxy server to connect to the VoIP proxy server with the lowest workload according an embodiment of the present invention.

Now referring to FIG. 5, the steps carried out by the VoIP client making the call and requesting the identity of the VoIP proxy server with the lowest workload will now be described. In step 68, a user of the VoIP system 10 initiates a call on the VoIP system via a VoIP client (e.g., the analog phones 16, the SIP phones 18, the IP phones 26, etc.). The user may, for example, pick up the receiver of the IP phone 26. Alternatively, the user may execute a VoIP program on a VoIP compatible computer 28. Further still, the user may pick up a receiver of the analog phone 16. In step 70, the VoIP client transmits the client request to the load balancing proxy server 14 (represented by network connection line 44 in FIG. 2). As previously described, such client request prompts the load balancing proxy server 14 to determine which VoIP proxy server currently has the lowest workload. Next in step 72, the client 36 receives a packet from the load balancing proxy server 14 containing the response to the client request including the identity of the VoIP proxy server with the lowest workload. The client 36 then proceeds to connect with the identified VoIP proxy server as represented by line 46 (FIG. 2), in step 74 in order to establish the call in an otherwise conventional manner.

As mentioned above, this method is based on a heuristic that the VoIP proxy server which can first respond to a request should have a lighter workload at the time of receiving the request. In addition, the "randomness" of proxy response time somewhat guarantees no proxy will be overwhelmingly or constantly loaded. Other refinements such as proportioning response time of VoIP proxy servers to new requests based on their workload can improve the randomness and thus result in a more uniform workload distribution among the proxies.

It will further be appreciated that the VoIP system 10 may alternatively have configurations other than the configurations shown in FIG. 1. Thus, there has been disclosed a system and method of identifying the VoIP proxy server with the lowest workload and providing such identity to a VoIP client so the VoIP client may connect to the VoIP system in order to make a VoIP call. This method permits the more efficient use of the VoIP proxy servers by balancing the workload among the VoIP proxy servers more efficiently. Additionally, although the flow charts of FIGS. 3–5 show a specific order of execution, it is understood that the order of execution may differ from that which is depicted. For example, the order of execution of two or more blocks may be scrambled relative to the order shown. Also, two or more blocks shown in succession in FIGS. 3–5 may be executed concurrently or with partial concurrence.

It will be appreciated that each of the respective devices described herein is programmed via conventional computer programming techniques to execute machine-readable code in order to carry out the operations described herein. Such programming may be easily performed by those having ordinary skill in the art of computer programming and IP technology based on the disclosure herein. Accordingly, the particular details of such programming code have been omitted for the sake of brevity.

Although particular embodiments of the invention have been described in detail, it is understood that the invention is not limited correspondingly in scope, but includes all changes, modifications and equivalents coming within the spirit and terms of the claims appended hereto.

What is claimed is:

1. A Voice-over-Internet Protocol (VoIP) system for effecting a VoIP call initiated by a VoIP client, comprising:
   a plurality of VoIP proxy servers; and
   a load balancing proxy server used to balance VoIP call load in the VoIP system, the load balancing proxy server configured to:
   receive a request from the VoIP client;
   upon receipt of the request from the VoIP client, transmit a request to each of the plurality of VoIP proxy servers;
   receive a response from a first one of the VoIP proxy servers to respond to the requests transmitted by the load balancing proxy server; and
   transmit to the VoIP client an identity of the first one of the VoIP proxy servers to respond as the VoIP proxy server with which the VoIP client should communicate to complete establishment of the VoIP call.

2. The VoIP system of claim 1, wherein the request from the VoIP client is a request for the identity of the VoIP proxy server having the lowest workload among the plurality of VoIP proxy servers.

3. The VoIP system of claim 1, wherein the requests transmitted by the load balancing proxy server to the VoIP proxy servers are call requests.

4. The VoIP system of claim 1, wherein the load balancing proxy server is further configured to cancel the requests transmitted to the remaining VoIP proxy servers upon receipt of the response from the first one of the VoIP proxy servers to respond to the requests.

5. The VoIP system of claim 1, wherein the first one of the VoIP proxy servers to respond to the requests is assumed to have the lowest workload of the plurality of VoIP proxy servers.

6. The VoIP system of claim 1, wherein the VoIP client, the VoIP proxy servers and the load balancing proxy server interface over a network that includes one or more of: a proprietary network, a network of leased facilities, the Internet, an Intranet, a wide-area-network (WAN), a local-area network (LAN) and a virtual private network (VPN).

7. The VoIP system of claim 1, further comprising a gateway that controls VoIP client access to the load balancing proxy server and the VoIP proxy servers.

8. The VoIP system of claim 7, wherein the gateway is one or more of: a VoIP gateway, a VoIP PSTN gateway, a media gateway, a router and an H.323 gateway.

9. A method of balancing workload in a Voice-over-Internet Protocol (VoIP) system having at least one VoIP client, a plurality of VoIP proxy sewers and a load balancing proxy server, comprising:
   receiving a request from the VoIP client with the load balancing proxy server;
   upon receipt of the request from the VoIP client, the load balancing proxy server transmitting a request to each of the plurality of VoIP proxy servers;
   receiving a response with the load balancing proxy server from a first one of the VoIP proxy servers to respond to the requests transmitted by the load balancing proxy server; and
   transmitting an identity of the first one of the VoIP proxy servers to respond from the load balancing proxy server to the VoIP client as the VoIP proxy server with which the VoIP client should communicate to complete establishment of a VoIP call.

10. The method of claim 9, wherein the request from the VoIP client is a request for the identity of the VoIP proxy server having the lowest workload among the plurality of VoIP proxy servers.

11. The method of claim 9, wherein the requests transmitted by the load balancing proxy server to the VoIP proxy servers are call requests.

12. The method of claim 9, further comprising, upon receipt of the identity of the VoIP proxy server with the VoIP client, the VoIP client communicating with the identified VoIP proxy server to establish the VoIP call.

13. The method of claim 9, further comprising, upon receipt of the response from the first one of the VoIP proxy servers to respond to the requests, the load balancing proxy server cancelling the requests transmitted to the remaining VoIP proxy servers.

14. The method of claim 9, wherein the first one of the VoIP proxy servers to respond to the requests is assumed to have the lowest workload of the plurality of VoIP proxy servers.

* * * * *